United States Patent
Krawczyk et al.

(10) Patent No.: US 7,396,090 B2
(45) Date of Patent: Jul. 8, 2008

(54) EHB PROPORTIONAL SOLENOID VALVE WITH STEPPED GAP ARMATURE

(75) Inventors: Gregory J. Krawczyk, Livonia, MI (US); Herbert L. Linkner, Jr., Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 56 days.

(21) Appl. No.: 11/349,536

(22) Filed: Feb. 7, 2006

(65) Prior Publication Data

US 2006/0208563 A1    Sep. 21, 2006

Related U.S. Application Data

(63) Continuation-in-part of application No. 09/465,487, filed on Dec. 16, 1999, now abandoned.

(60) Provisional application No. 60/112,431, filed on Dec. 16, 1998.

(51) Int. Cl.
*B60T 8/36* (2006.01)

(52) U.S. Cl. .............. 303/119.2; 251/129.02; 251/129.15

(58) Field of Classification Search .......... 303/119.2, 303/129.01, 129.02, 129.06, 129.08, 129.15; 137/315.03; 335/279
See application file for complete search history.

(56) References Cited

U.S. PATENT DOCUMENTS

| | | | |
|---|---|---|---|
| 3,829,060 A * | 8/1974 | von Lewis ............. | 251/129.02 |
| 4,097,833 A | 6/1978 | Myers | |
| 4,334,205 A | 6/1982 | Seilly | |
| 4,553,121 A | 11/1985 | Logie | |
| 4,658,231 A | 4/1987 | Schwenzer et al. | |
| 5,085,402 A | 2/1992 | O'Dell | |
| 5,110,087 A | 5/1992 | Studtmann et al. | |
| 5,318,066 A * | 6/1994 | Burgdorf et al. ......... | 303/119.2 |
| 5,503,184 A | 4/1996 | Reinartz et al. | |
| 5,513,673 A | 5/1996 | Slavin et al. | |
| 5,673,980 A * | 10/1997 | Schwarz et al. .......... | 303/119.2 |
| 5,725,289 A * | 3/1998 | Mueller et al. ........... | 303/119.2 |
| 6,120,003 A | 9/2000 | Lubischer et al. | |
| 6,305,583 B1 | 10/2001 | Ward et al. | |
| 6,498,558 B1 | 12/2002 | Linkner et al. | |
| 6,994,406 B1 | 2/2006 | Krawczyk et al. | |

* cited by examiner

*Primary Examiner*—Robert A. Siconolfi
*Assistant Examiner*—Mariano Sy
(74) *Attorney, Agent, or Firm*—MacMillan, Sobanski & Todd, LLC (57) ABSTRACT

A control valve includes a magnetic pole member. An armature is slidably supported relative to the magnetic pole member for movement between a fully open position and a closed position. A biasing spring is disposed between the magnetic pole member and the armature for forcing the armature away from the magnetic pole member. A coil is placed about the magnetic pole member and the armature for inducing a magnetic field for moving the armature toward the magnetic pole member. One of either of the magnetic pole member or the armature has a recess for non-contactingly receiving the other when the armature moves between the fully open and closed positions. The control valve can be embodied as a normally open valve or a normally closed valve. The use of dual lateral poles and triple lateral poles create a flat magnetic force versus travel curve thereby allowing for greater proportional control of the valve. Additionally, the use of double lateral gaps and triple lateral gaps respectively results in force increases of 21% and 12% respectively. Compounding the force increases results in a net additional force of 36%.

3 Claims, 11 Drawing Sheets

EHB PROPORTIONAL SOLENOID VALVE WITH STEPPED GAP ARMATURE

CROSS REFERENCE TO RELATED APPLICATIONS

This application claims the benefit of U.S. Provisional Application No. 60/325,569 filed Sep. 28, 2001 and is a Continuation-In-Part of U.S. patent application Ser. No. 09/465,487, filed Dec. 16, 1999, now abandond which in turn claims the benefit of U.S. Provisional Application No. 60/112,431, filed on Dec. 16, 1998.

INCORPORATION BY REFERENCE

The disclosures of U.S. patent application Ser. No. 09/465, 487 filed Dec. 16, 1999 and U.S. Patent Application No. 60/112,431 filed Dec. 16, 1998 are hereby incorporated by reference.

BACKGROUND OF THE INVENTION

This invention relates in general to vehicular brake systems, and in particular to control valves for electronically controlled vehicular brake systems.

Electronically controlled brake systems for vehicles are well known. A typical electronically controlled brake system includes a hydraulic control unit (HCU) connected in fluid communication between a master cylinder and a plurality of wheel brake assemblies. The HCU includes a housing containing control valves and other components such as a pump for selectively controlling pressure to the wheel brake assemblies.

The control valves are generally formed as electronically controlled solenoid valves. A typical solenoid valve includes a cylindrical armature slidably disposed in a tube or a sleeve for movement relative to a valve body. The armature may be biased in a fully open or closed position. The typical solenoid valve further includes a coil subassembly that generates a magnetic flux for moving the armature from the biased fully open position or closed position to a closed position or fully open position, respectively.

These types of control valves are generally used to control brake fluid pressure during non-base braking events, such as anti-lock, traction control, and vehicle stability control modes. However, because these types of valves are designed to operate generally in only the fully open and closed positions they do not provide "proportional" control characteristics desirable for controlling brake fluid pressure during base ("normal") braking events. As such, these types of solenoid valves are generally not well suited for applications in which the brake fluid pressure is electronically controlled during base braking events.

Other types of prior art valves, such as spool valves, have been proposed which are capable of providing desirable proportional control characteristics for electronically controlling brake fluid pressure during base braking events. However, these types of valves are relatively expensive.

Accordingly there is a need for a control valve used in electronically controlled vehicular brake systems that is relatively inexpensive and provides for proportional control of brake fluid pressure during base braking events.

SUMMARY OF THE INVENTION

The invention relates to a control valve for vehicular brake systems. The control valve includes a magnetic pole member. An armature is slidably supported relative to the magnetic pole member for movement between a fully open position and a closed position. A biasing spring is disposed between the magnetic pole member and the armature for forcing the armature away from the magnetic pole member. A coil is placed about the magnetic pole member and the armature for inducing a magnetic field for moving the armature toward the magnetic pole member. One of either of the magnetic pole member or the armature has a recess for non-contactingly receiving the other when the armature moves between the fully open and closed positions. The control valve can be embodied as a normally open valve or a normally closed valve.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
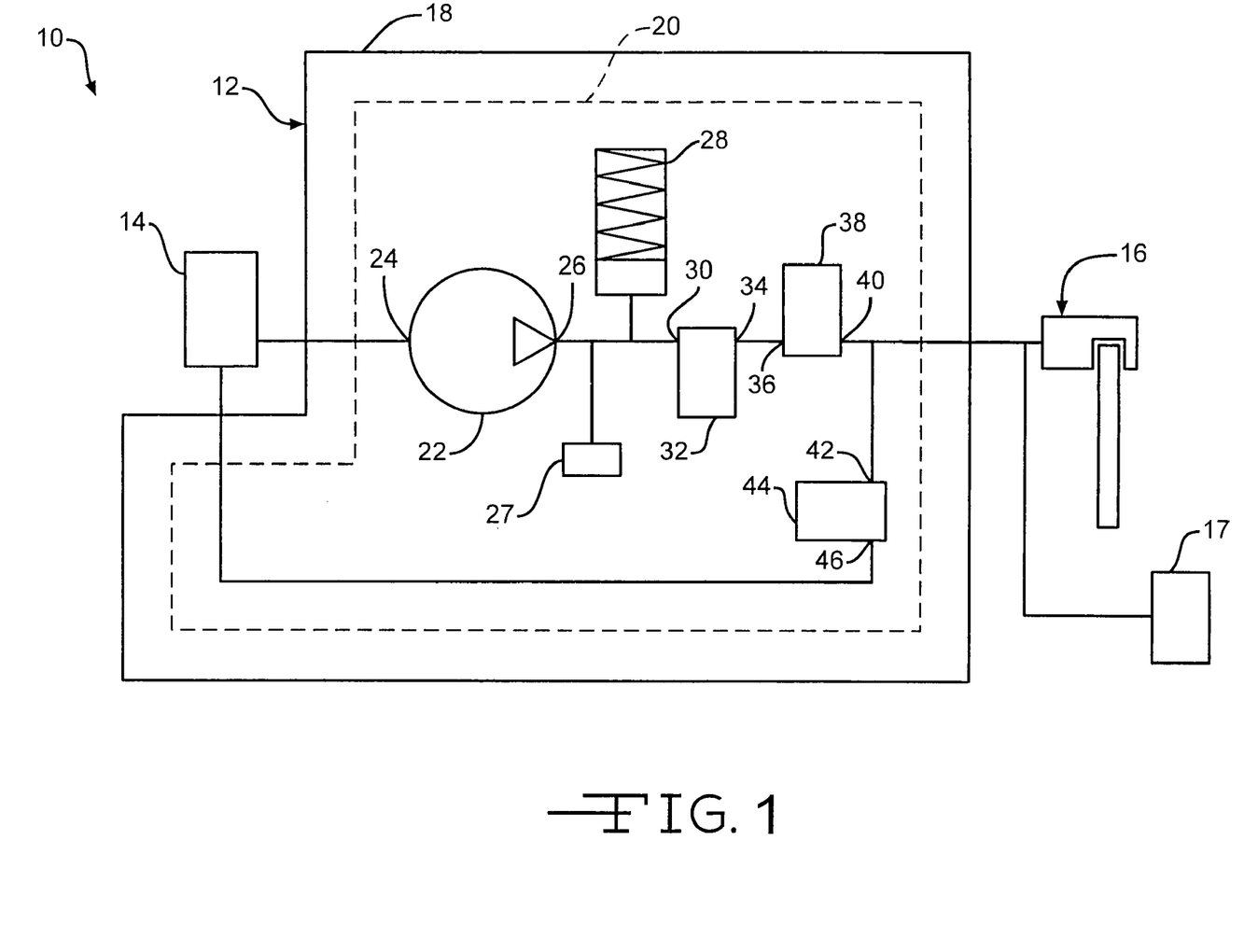
FIG. 1 is a schematic diagram of a vehicular brake system including a hydraulic control unit having control valves according to this invention.

A vehicular brake system is shown generally at 10 in FIG. 1. The brake system 10 includes a hydraulic control unit (HCU), indicated generally at 12, connected in fluid communication with a fluid supply source 14 and a plurality of wheel brake assemblies indicated generally at 16 (only one shown). A first pressure sensor 17 is a connected in fluid communication with each of the wheel brakes. The wheel brake assembly 16 is shown as a disc brake 16. Alternatively, the wheel brake assembly 16 may be a drum brake or any other known vehicular wheel brake assembly.

The HCU 12 includes a housing 18 containing a plurality of brake circuits 20. Each brake circuit 20 includes a set of components for controlling the brake pressure of at least one of the wheel brake assemblies 16. For purposes of clarity of illustration, only one brake circuit 20 is illustrated.

The brake circuit 20, as shown, includes a pump 22 having a pump inlet 24 and a pump outlet 26. The pump inlet 24 is connected in fluid communication with the fluid supply source 14. The pump outlet 26 is connected in fluid communication with a second pressure sensor 27, an accumulator 28 and in inlet 30 of a cutoff valve 32. The accumulator 28 is also connected in fluid communication with the inlet 30 of the cutoff valve 32. An outlet 34 of the cutoff valve 32 is connected in fluid communication with an inlet 36 of an isolation valve 38. An outlet 40 of the isolation valve 38 is connected in fluid communication with the wheel brake assembly 16 and an inlet 42 of a dump valve 44. The inlet 42 of the dump valve 44 is also connected in fluid communication with the wheel brake assembly 16. An outlet 46 of the dump valve 44 is connected in fluid communication with the fluid supply source 14.

The pump 20 and accumulator 28 are of well-known types. Preferably, the cutoff valve 32 is a bi-positionable control valve movable between opened and closed positions. Preferably, the isolation valve 38 and the dump valve 44 are embodied as normally closed and normally open control valves, respectively. Alteratively, the isolation valve 38 may be embodied as a normally open control valve and/or the dump valve 44 may be embodied as a normally closed control valve.

It is understood that for other vehicular brake systems the HCU 12 may include additional, less or differing components. Such components may be placed in different fluid communication arrangements depending on the specified performance requirements and/or functions provided by the designated vehicular brake system.

Figure 2:
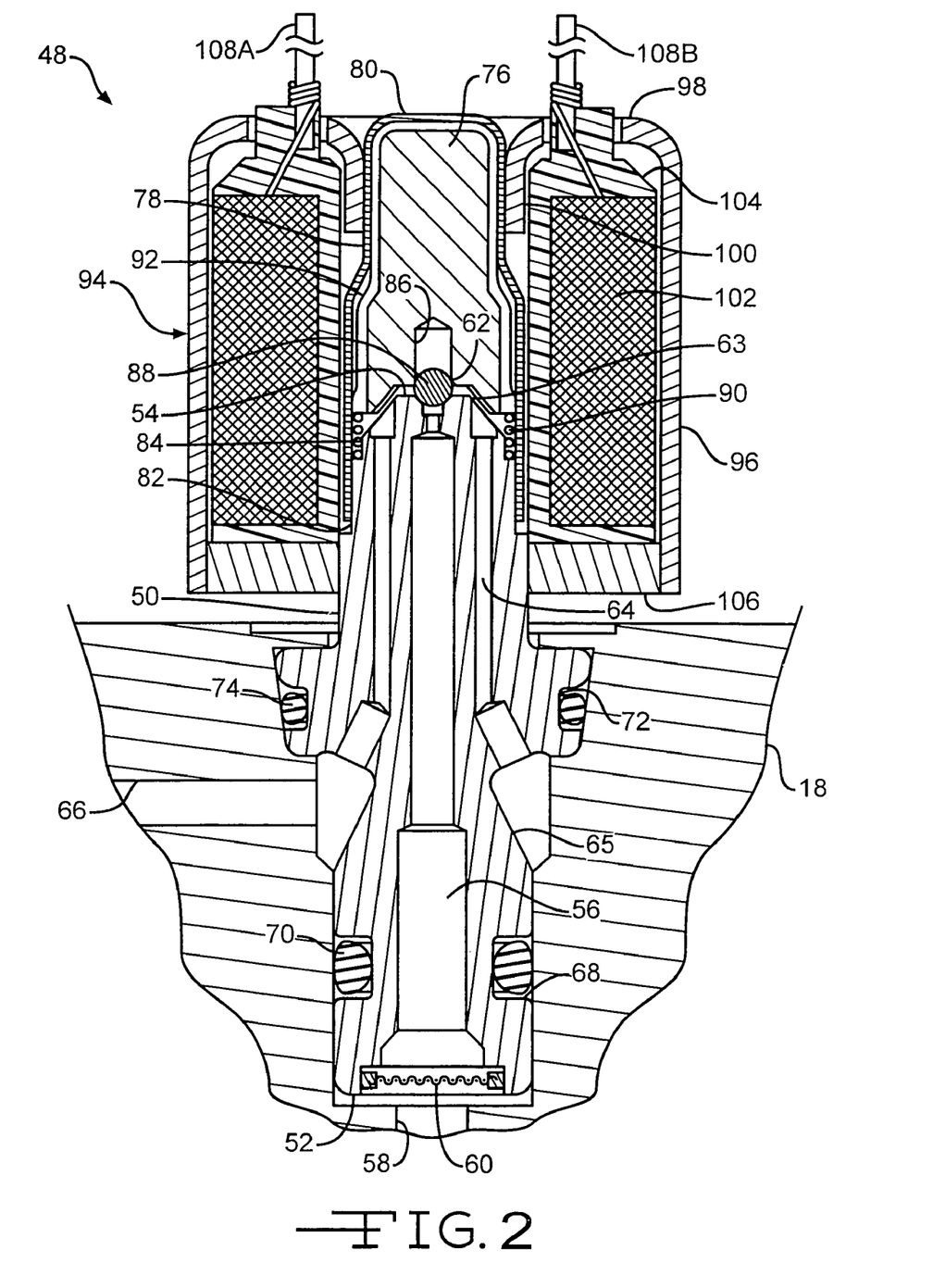
FIG. 2 is a sectional view of a normally open control valve according to the present invention illustrated in an energized closed position.

FIG. 2 illustrates the structure of a normally open control valve 48 according to this invention. The control valve 48 may be employed as the isolation valve 38 and/or the dump valve 44 schematically shown in FIG. 1. The control valve 48 includes a magnetic pole member or cylindrical valve body 50 having a first end 52 and a second end 54. The valve body 50 is fixedly disposed in the housing 18 with a portion of the valve body 50 adjacent to the second end 54 extending from the housing 18. An inlet fluid passage 56 extends from the first end 52 to the second end 54 through a central portion of the valve body 50. The opening of the inlet fluid passage 56 at the first end 52 aligns with a conduit 58 formed in the housing 18. When the control valve 48 is employed as the isolation valve 38, the conduit 58 is adapted for placement in fluid communication with the outlet 34 of the cutoff valve 32. When employing the control valve 48 as the dump valve 44, the conduit 58 is adapted for placement in fluid communication with the outlet 40 of the isolation valve 38 and the wheel brake assembly 16. A filter assembly 60 is pressed into the opening at the first end 52 for filtering particulate from the fluid entering the control valve 48. The filter assembly 60 is optional.

A portion of the inlet fluid passage 56 extending inwardly from the second end 54 of the valve body 50 forms a valve seat 62. Preferably, the valve seat 62 is conical. Alternatively, the valve seat 62 may be of any suitable shape. A portion of the valve body 50 directly adjacent to the second end 54 tapers outwardly from the second end 54 forming a frustum 63. As described below, the frustum 63 forms an extending portion of the valve body 50. A plurality of outlet fluid passages 64 extend from an outer surface of the frustum 63 to an annular recess 65 formed in the valve body 50. The annular recess 65 aligns with a conduit 66 formed in the housing 18. When the control valve 48 is employed as the isolation valve 38, the conduit 66 is adapted for placement in fluid communication with the wheel brake assembly 16 and the inlet 42 of the dump valve 44. When employing the control valve 48 as the dump valve 44, the conduit 66 is adapted for placement in fluid communication with the fluid supply source 14.

A first annular groove 68 is formed in the valve body 50 between the first end 52 and the annular recess 65. A first seal 70 is disposed in the first groove 68 for preventing fluid from flowing outside the valve body 50 between the first end 52 and the annular recess 65. A second annular groove 72 is formed in the valve body 50 between the second end 54 and the annular recess 65. A second seal 74 is disposed in the second groove 72 for preventing fluid from the annular recess 65 from escaping the housing 18. The first and second seals 70, 74 may be of any suitable type, such as O-rings.

The control valve 48 further includes an armature 76 slidably disposed in a sleeve 78 for movement between a fully open position and a closed position. The sleeve 78 has an open end and a closed end 80. The open end of the sleeve 78 receives a portion of the valve body 50 adjacent to the second end 54. The sleeve 78 is secured to a stepped portion 82 of the valve body 50. Preferably, the sleeve 78 is laser welded to the stepped portion 82 so as to provide a fluid tight seal between the sleeve 78 and valve body 50.

An conical shaped recess 84 complementary to the frustum 63 is formed at the end of the armature 76 adjacent to the frustum 63 for receiving the frustum 63 when the armature 76 moves from the fully open position to the closed position. An axial bore 86 aligning with the inlet fluid passage 56 is formed in the armature 76. A valve ball 88 is pressed into the bore 86 with a portion of the valve ball 88 extending from the bore 86. The valve ball 88 engages the valve seat 62 when the armature 76 is in the closed position as illustrated in FIG. 2, such that a gap is maintained between the frustum 63 and the recess 84. The valve ball 88 is substantially non-deformable and sized to block fluid from flowing from the inlet fluid passage 56 to the outlet fluid passages 64 when in the closed position. The valve ball 88 is preferably non-magnetic, but may be magnetic.

As shown, the opening of the bore 86 is flush with the base of the recess 84. Alternatively, the material surrounding the opening of the bore 86 may extend outwardly away from the base of the recess 84 for the purpose of increasing the gap or distance between the frustum 63 and the recess 84 at the closed position.

A biasing spring 90 is placed about the valve body 50 between the stepped portion 82 and the frustum 63. One end of the biasing spring 90 engages an inner collar of the stepped portion 82 and the other end of the biasing spring 90 engages an end of the armature 76 adjacent to the valve body 50. The biasing spring 90 resiliently biases the armature 76 in the fully open position such that the valve ball 88 is fully spaced from the valve seat 62.

Axial troughs 92 are formed along the perimeter of the armature 76 for providing a fluid passageway between the ends of the armature 76. The troughs 92 prevent a fluid lock-up condition inhibiting the rapid displacement of the armature 76 relative to the valve body 50.

The control valve 48 further includes a solenoid subassembly, indicated generally at 94. The solenoid subassembly 94 includes a cylindrical casing 96 having an open end and a partially enclosed end 98 that includes a turned-in flange 100. A coil 102 is disposed within the casing 96. The coil 102 is shown wound upon a bobbin 104, but may be used without the bobbin 104. When energized, the coil 102 induces a magnetic flux between the armature 76 and the valve body 50 for moving the armature 76 from the fully open position to the closed position. A flux ring 106 is pressed into the casing 96 adjacent to the open end of the casing 96 for securing the bobbin 104. Winding terminals 108a and 108b extend outwardly through respective openings formed in the partially enclosed end 98. The terminals 108a, 108b are adapted for connection to an electronic module (not shown) of a well-known type.

The solenoid subassembly 94 is placed about the sleeve 78 and a portion of the valve body 50 extending from the housing 18. The solenoid subassembly 94 is held in place by any desired means, such as by a module cap (not shown) of a well-known type.

Figure 3:
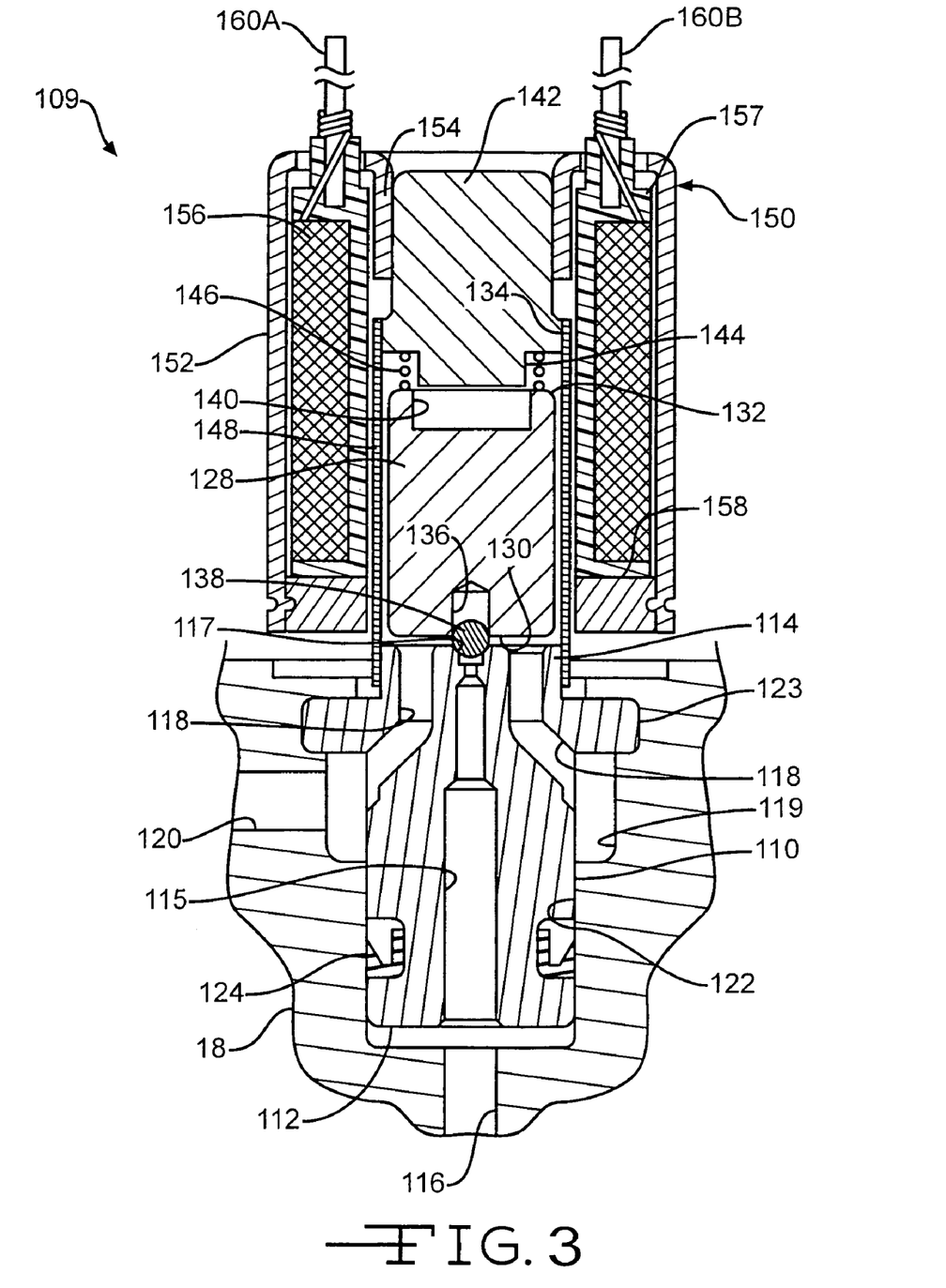
FIG. 3 is a sectional view of a normally closed control valve according to the present invention illustrated in a non-energized closed position.

FIG. 3 illustrates the structure of a normally closed control valve 109 according to this invention. As mentioned above, the control valve 109 may be employed as the isolation valve 38 and/or the dump valve 44 schematically shown in FIG. 1. The control valve 109 includes a generally cylindrical valve body 110 having a first end 112 and a second end 114. The valve body 110 is fixedly disposed in the housing 18 with a portion adjacent to second end 114 extending from the housing 18. An inlet fluid passage 115 extends between the ends 112, 114 through a central portion of the valve body 110. The opening of the inlet fluid passage 115 at the first end 112 aligns with a conduit 116 formed in the housing 18. When the control valve 109 is employed as the isolation valve 38, the conduit 116 is adapted for placement in fluid communication with the outlet 34 of the cutoff valve 32. When employing the control valve 109 as the dump valve 44, the conduit 116 is adapted for placement in fluid communication with the outlet 40 of the isolation valve 38 and the wheel brake assembly 16. An optional filter assembly (not shown), such as the filter assembly 60 shown in FIG. 2, may be pressed into the opening at the first end 112. The opening of the inlet fluid passage 115 at the second end 114 forms a valve seat 117. Preferably, the valve seat 117 is conical. Alternatively, the valve seat 117 may be of any suitable shape.

A plurality of outlet fluid passages 118 are formed in the valve body 100. Each outlet fluid passages 118 includes an opening at the second end 114 and an opening adjoining an annular chamber 119 formed between the first and second ends 112, 114, which is bounded by the outer surface of the valve body 110 and a counterbore formed in the housing 18. A conduit 120 formed in the housing 18 is placed in fluid communication with the chamber 119. When the control valve 109 is employed as the isolation valve 38, the conduit 120 is adapted for placement in fluid communication with the wheel brake assembly 16 and the inlet 42 of the dump valve 44. When employing the control valve 109 as the dump valve 44, the conduit 120 is adapted for placement in fluid communication with the fluid supply source 14.

An annular groove 122 is formed in the valve body 110 between the first end 112 and the chamber 119. A first seal 124 of any suitable type is disposed in the first groove 122 for preventing fluid from flowing outside the valve body 110 between the first end 112 and the chamber 119. The valve body 110 further includes an annular flange 123 adjacent to the second end 114. The annular flange 123 is sealably secured within a counterbore formed in the housing 18.

The control valve 109 further includes an armature 128 having a first end 130 and a second end 132 slidably disposed in a tube 134 for movement between a closed position and a fully open position. The tube 134 receives a portion of the valve body 110 such that the second end 114 of the valve body 110 is adjacent to the first end 130 of the armature 128. The tube 134 is preferably laser welded to the valve body 110 so as to provide a fluid tight seal.

An axial bore 136 aligning with the inlet fluid passage 115 is formed in the first end 130 of the armature 128. A valve ball 138 is pressed into the bore 136 with a portion of the valve ball 138 extending from the bore 136. The valve ball 138 engages the valve seat 117 when the armature 128 is in the closed position as illustrated in FIG. 3, such that a gap is maintained between the armature 128 and the openings of the outlet fluid passages 118 at the second end 114. The valve ball 138 is substantially non-deformable and sized to block fluid from flowing from the outlet fluid passages 118 to the inlet fluid passage 115 when in the closed position. A cylindrically shaped recess 140 is formed in the second end 132 of the armature 128.

The control valve 109 further includes a magnetic pole member or cylindrical core element 142 extending from and sealably secured to the tube 134 adjacent to the second end 132 of the armature 128. The core element 142 has an inwardly stepped portion 144 complementary to the recess 140. The recess 140 receives the stepped portion 144 when the armature 128 moves from the closed position to the fully open position. A biasing spring 146 is placed about the stepped portion 144 and engages the corresponding ends of the armature 128 and core element 142. The biasing spring 146 resiliently biases the armature 128 in the closed position such that the valve ball 138 is firmly seated in the valve seat 117, thereby preventing fluid from flowing from the inlet fluid passage 115 to the outlet fluid passages 118. Alternatively, the biasing spring 146 may be replaced by a spring (not shown) disposed in an axial bore (not shown) formed in either the core element 142 or the armature 128.

Axial troughs 148 are formed along the perimeter of the armature 128 for providing a fluid passageway between the ends 130, 132 of the armature 128. The troughs 148 prevent a fluid lock-up condition inhibiting the rapid displacement of the armature 128.

The control valve 109 further includes a solenoid subassembly indicated generally at 150. The solenoid subassembly 150 includes a cylindrical casing 152 that is open at one end and having a turned-in flange 154 at the other end. A coil 156 is disposed in the casing 152. The coil 156 is shown wound upon a bobbin 157, but may used without the bobbin 157. When energized, the coil 156 induces a magnetic field between the armature 128 and the core element 142 for moving the armature 128 from the closed position to the fully open position. A flux ring 158 is pressed into the casing 152 adjacent to open end of the casing 152 for securing the bobbin 158. Winding terminals 160a and 160b extend outwardly through respective openings adjacent to the flange 154. The terminals 160a, 160b are adapted for connection to the electronic module.

The solenoid subassembly 150 is placed about the tube 134 and the portion of the core element 142 extending from the tube 134. The subassembly 150 is held in place by any desired known means.

In operation, the electronic controller commands the pump 22 to cycle when the fluid pressure in the accumulator 28 falls below a predetermined working pressure. The pump 22 in turn transfers fluid from the fluid supply source 14 to the accumulator 28. The electronic controller commands the pump 22 to cease cycling when the accumulator 28 is fully charged.

In addition, the electronic controller commands the cutoff valve 32 to open and close for controlling fluid flow to the isolation valve 38. During non-braking events the cutoff valve 32 is closed, whereas during braking events the cutoff valve 32 is opened.

Additionally, the electronic controller, acting upon input signals received from the pressure sensors 17, 27 and various other control sensors (not shown) of well-known types, selectively energizes mid de-energizes the isolation valve 30 and the dump valve 44 during designated braking events.

In employing the normally open control valve 48 as the isolation valve 30 or the dump valve 44, the electronic controller, when energizing the control valve 48, controls the amount of current supplied to the coil 102 for the purpose of controlling the fluid pressure of the wheel brake assembly 16. Having been supplied with a given current, the coil 102 induces a given magnetic flux between the magnetic pole member or valve body 50 and the armature 76. The given magnetic flux in turn generates a given magnetic force on the armature 76 that acts to move the armature 76 from the fully open position toward the closed position. In addition to being dependent on the amount of current supplied to the coil 102, the magnetic force acting on the armature 76 is dependent on the distance between the frustum 63 and the recess 84. In moving from the fully open position to the closed position, the armature 76 works against the biasing spring 90 and the increasing pressure of fluid between the armature 76 and the valve body 50. Accordingly, the amount of movement of the armature 76 is a function of the magnetic force acting on the armature 76, the spring rate of the biasing spring 90 and the fluid pressure between the armature 76 and the valve body 50.

As the armature 76 moves toward the closed position, the valve ball 88 advances toward the valve seat 62, which in turn causes the flow rate from the inlet fluid passage 56 to the outlet fluid passages 64 to steadily decrease. When the armature 76 is positioned in the closed position, the valve ball 88 engages the valve seat 62, thereby blocking the flow of fluid from the inlet fluid passage 56 to the outlet fluid passages 64. When the normally open valve 48 is de-energized, the biasing spring 90 forces the armature 76 to return to the fully opened position.

In employing the normally closed control valve 109 as the isolation valve 30 or the dump valve 44, the electronic controller, when energizing the control valve 109, controls the amount of current supplied to the coil 156 for the purpose of controlling the fluid pressure of the wheel brake assembly 16. Having been supplied with a given current, the coil 156 induces a given magnetic flux between the magnetic pole member or core element 142 and the armature 128. The given magnetic flux in turn generates a given magnetic force on the armature 128 that acts to move the armature 128 from the closed position toward the fully open position. In addition to being dependent on the amount of current supplied to the coil 156, the magnetic force acting on the armature 128 is dependent on the distance between the stepped portion 144 and the recess 140. In moving from the closed position to the fully open position, the armature 128 works against the biasing spring 146 and the decreasing pressure of the fluid between the armature 128 and the valve body 110. Accordingly, the amount of movement of the armature 128 is a function of the magnetic force acting on the armature 128, the spring rate of the biasing spring 146 and the fluid pressure between the armature 128 and the valve body 110.

As the armature 128 moves toward the fully open position, the valve ball 138 retreats from the valve seat 117, which in turn causes the flow rate from the inlet passage 115 to the outlet flow passages 118 to steadily increase. When the normally closed control valve 36 is de-energized, the biasing spring 156 forces the armature 128 to return to the closed position.

When the isolation valve 38 is open, pressurized fluid is transferred from the accumulator 28 to the wheel brake assembly 16 through the inlet fluid passage 56 and the outlet fluid passages 64. When the dump valve 44 is open, fluid is transferred from the wheel brake assembly 16 to the fluid supply source 14 through the inlet fluid passage 115 and the outlet passages 118.

Figure 4:
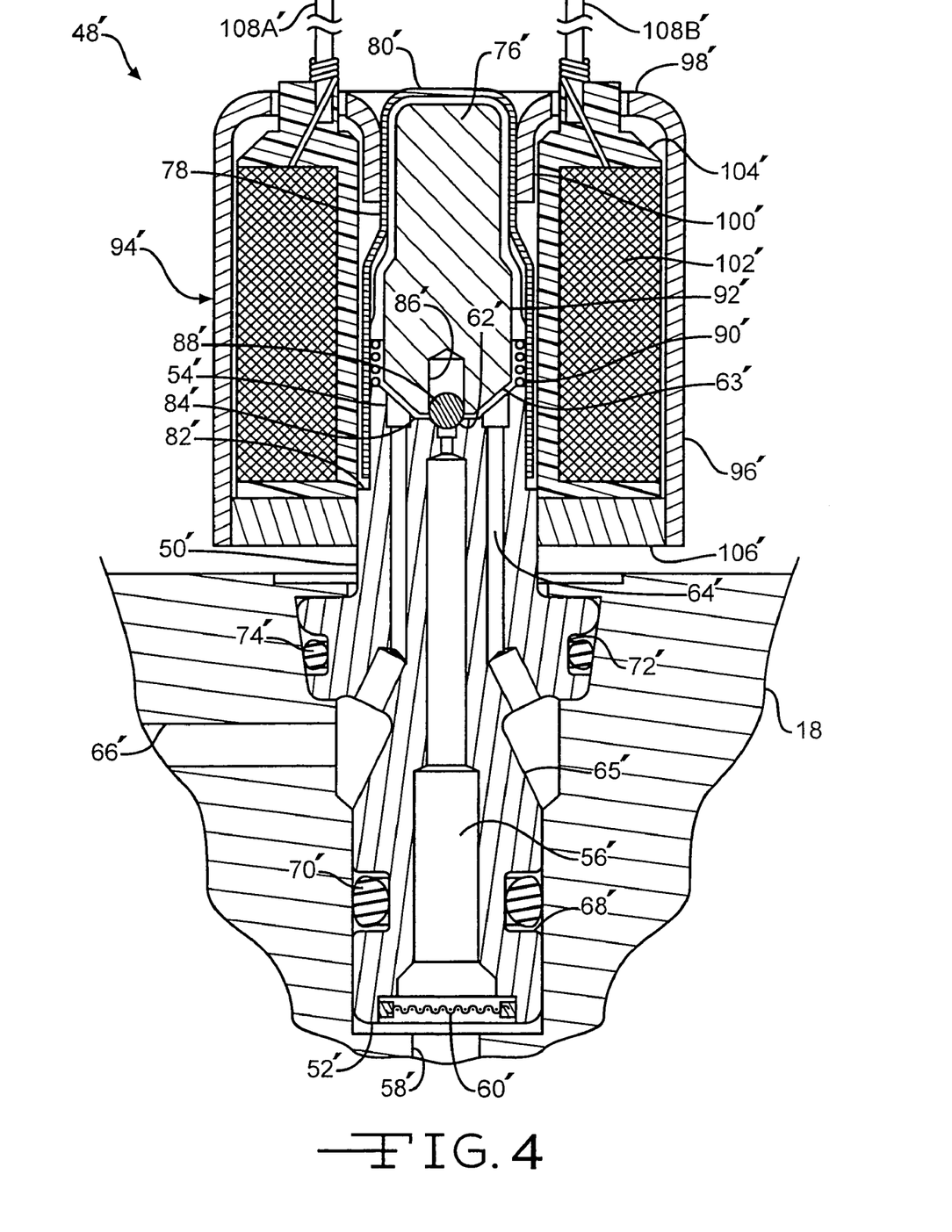
FIG. 4 is a sectional view of a second embodiment of a normally open control valve according to this invention illustrated in an energized closed position.

In the embodiment shown in FIG. 2, the recess 84 of the armature 76 receives the frustum 63 of the valve body 50. Alternatively, the orientation of the frustum 63 and the recess 84 may be reversed. Specifically, FIG. 4 shows a normally open control valve 48' including a valve body 50' having a recess 84' formed at one end. The control valve 48' further includes in armature 76' having a frustum 63' formed at an end adjacent to the recess 84'. As with the control valve 48 shown in FIG. 2, the frustum 63' is complementary of the recess 84'.

Similarly, with respect to the normally closed valve 109, the male and female orientation of the corresponding ends of the armature 128 and the core element 142 may be reversed.

In addition, while the corresponding or mating ends of the valve bodies 50 and 50' and the armatures 76 and 76' are shown as complementary cone shapes, the mating ends may be any desired shape such as cylindrical, square or the like. Moreover, while it is preferable the mating ends be complementary they need not be. Likewise, the mating ends of the armature 128 and the core element 142 may be any desired shapes whether complementary or not.

An important feature is that the armature 76, 76', 128 and corresponding magnetic pole member 50, 50', 142 are receivable in one or the other. The purpose of such constructions is to provide an overlapping arrangement between the armature 76, 76', 128 and corresponding magnetic pole member 50, 50', 142 as the armature 76, 76', 128 moves between the open and closed positions. This overlapping arrangement in turn provides for a more gradual change in the magnetic force acting upon the armature 76, 76', 128 as the armature 76, 76', 128 is displaced relative to the corresponding magnetic pole member 50, 50', 142 when compared to a valve structure absent the overlapping arrangement. A flatter magnetic force versus displacement curve provides for smoother controlled movement of the armature 76, 76', 128, thereby reducing the noise and vibration levels of the isolation valve 38, 38' and dump valve 44 as compared to conventional isolation and dump valves.

Figure 5:
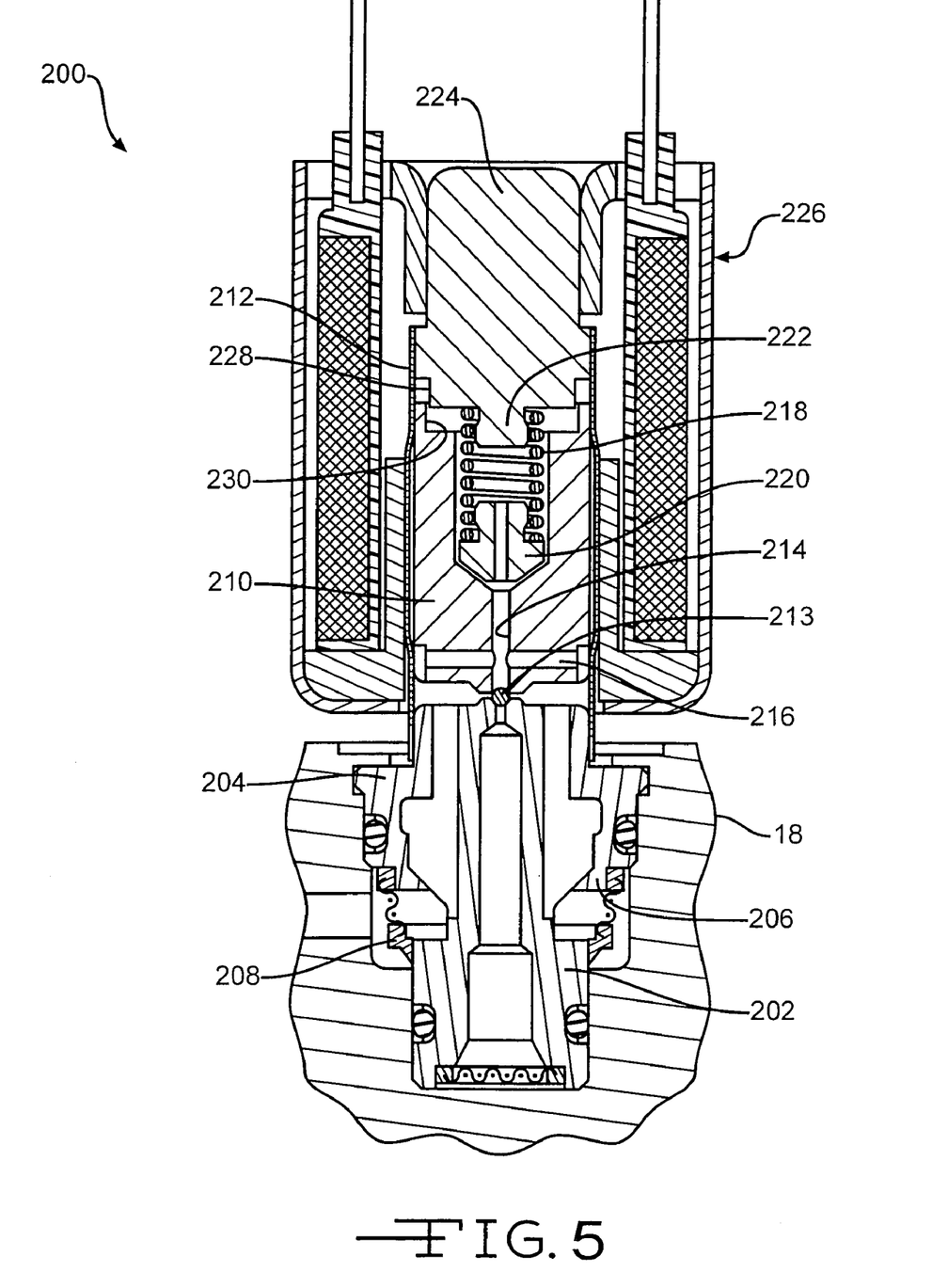
FIG. 5 is a sectional view of a second embodiment of a normally closed control valve according to the present invention illustrated in a non-energized closed position.

A second embodiment of a normally closed control valve is indicated generally at 200 in FIG. 5. The control valve 200 can be used as the isolation valve 38 and/or the dump valve 44 in the brake system 10 of FIG. 1. The control valve 200 includes a seat or valve body 202 mounted in the housing 18. An adapter 204 has a lower annular flange 206 that is crimped onto the seat 202 to retain the adapter 204 thereto. An annular filter assembly 208 is fitted about the adapter 204 and seat 202.

An armature 210 is slidably disposed in a tube or sleeve 212. A ball 213 is pressed into au axial bore 214 formed in the armature 210. A cross hole 216 is formed in the armature 210 in fluid communication with the axial bore 214. A first end of a spring 218 engages an insert 220 disposed in a cavity in the armature 210. A second end of the spring 218 is fitted about an extension 222 formed on a magnetic pole member 224. A solenoid subassembly 226 is fitted over the pole member 224 and sleeve 212. Upon energization, the solenoid subassembly 226 produces an electromagnetic force that urges the armature 210 against the spring 218 toward the pole member 224 to open the control valve 200.

The pole member 224 has an inwardly stepped portion 228 complementary to a recess 230 formed in the armature 212. The recess 230 receives the stepped portion 228 when the armature 212 moves from a closed position to an open position. The magnetic force acting on the armature 212 is dependent upon current supplied to the solenoid subassembly 226 and the distance between the stepped portion 228 and the recess 230.

Figure 6:
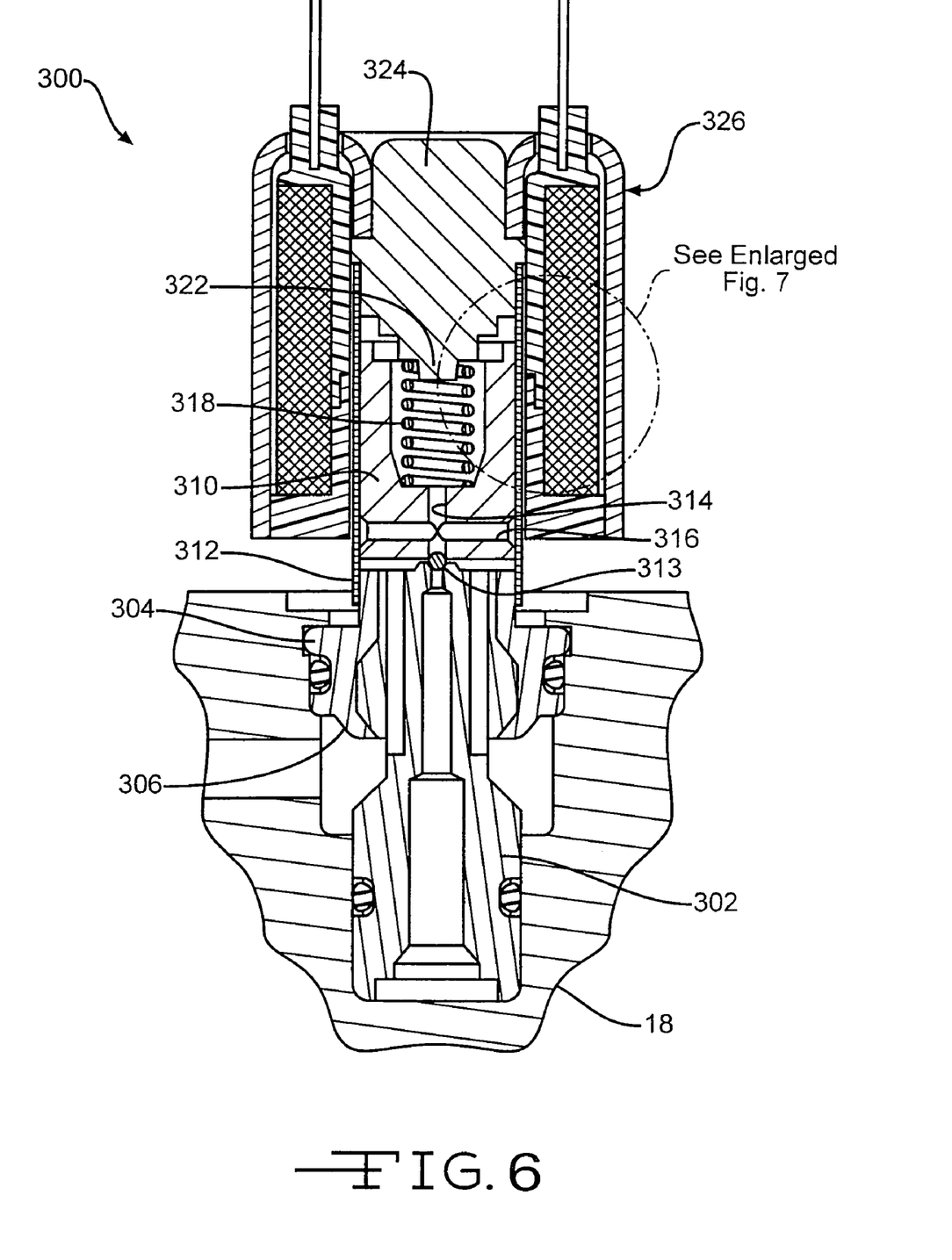
FIG. 6 is a sectional view of a third embodiment of a normally closed control valve according to the present invention illustrated in a non-energized closed position.

A third embodiment of a normally closed control valve is indicated generally at 300 in FIG. 6. The control valve 300 can be used as the isolation valve 38 and/or the dump valve 44 in the brake system 10 of FIG. 1. The control valve 300 includes a seat or valve body 302 mounted in the housing 18. An adapter 304 has a lower annular flange 306 that is crimped onto the seat 302 to retain the adapter 304 thereto. An annular filter assembly (not illustrated) can be fitted about the adapter 304 and seat 302.

An armature 310 is slidably disposed in a tube or sleeve 312. A ball 313 is pressed into an axial bore 314 formed in the armature 310. A cross hole 316 is formed in the armature 310 in fluid communication with the axial bore 314. A first end of a spring 318 engages the armature 310. A second end of the spring 318 is fitted about an extension 322 formed on a magnetic pole member 324. A solenoid subassembly 326 is fitted over the pole member 324 and sleeve 312. Upon energization, the solenoid subassembly 326 produces an electromagnetic force that urges the armature 310 against the spring 318 toward the pole member 324 to open the control valve 300.

Figure 7:
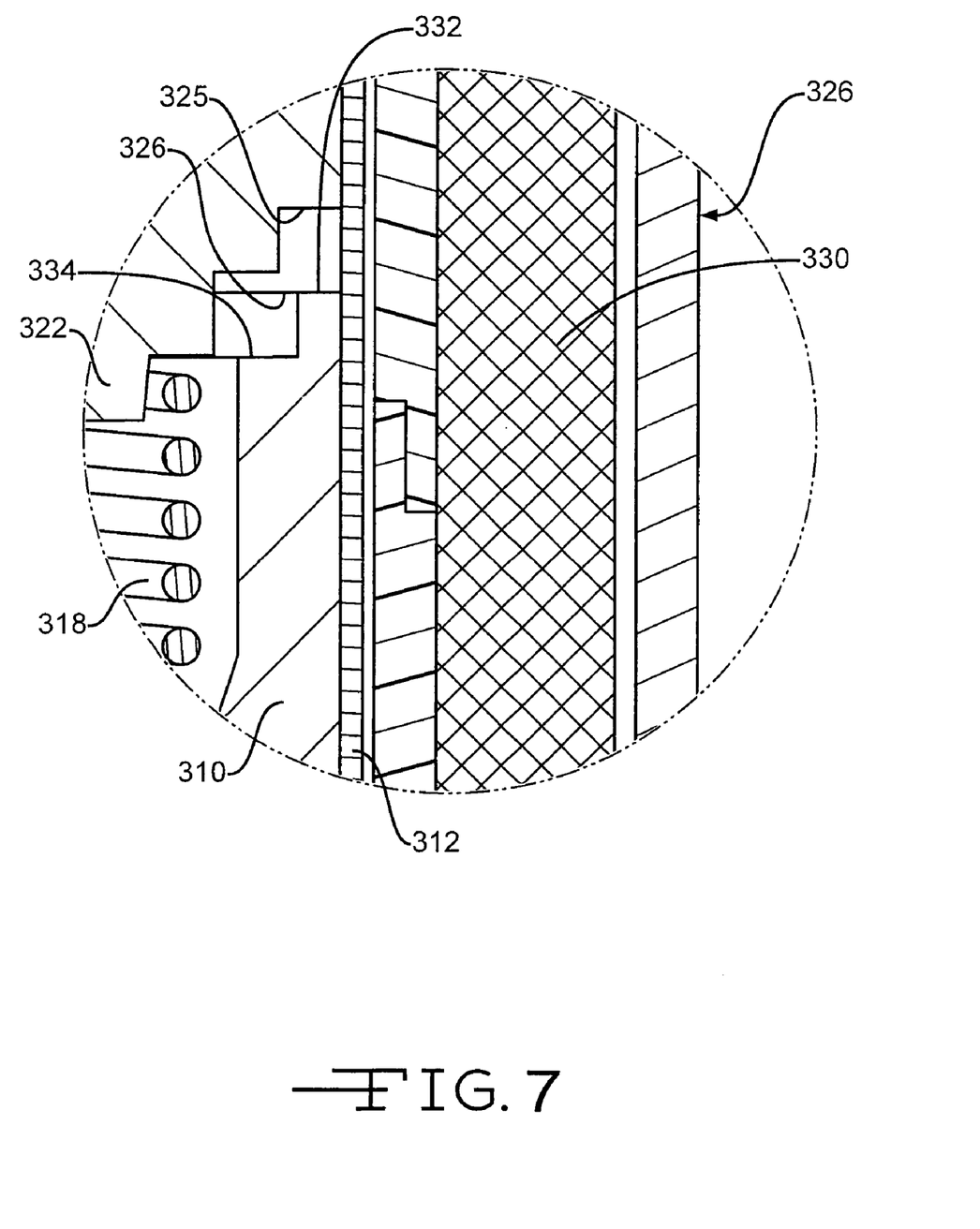
FIG. 7 is an enlarged portion of the control valve of FIG. 6 bounded by the circle A.

The pole member 324 has a series of inwardly stepped portions. In the embodiment of FIG. 6, a first stepped portion 325 and a second stepped portion 326 are shown. A recess 330 is formed in the armature 310. The recess 330 is complementary to and receives the stepped portions 325 and 326 when the armature 310 moves from a closed position to an open position. Preferably, the recess 330 includes a first stepped portion 332 and a second stepped portion 334. This "double step" formed between the pole member 324 and the armature 310 increases the air gap area in the control valve 300 so that its output force is increased without increasing the size of the control valve 300. The increased axial force provided by this construction can permit the size of a control valve 300 to be reduced and still provide a desired output force.

Proportional solenoids with cylindrical lateral magnetic gaps can be designed to have magnetic output forces that are reasonably constant over their operating travel range. This allows stable operation and minimized the effects of axial tolerances of the parts. The permeance and axial force of this type of lateral magnetic gap are described by the following equations:

$$P = \frac{\mu S}{g} \quad P = \text{permeance of lateral gap} \tag{1}$$

$\mu$ = permeability of medium in gap $$F_{axial} = \frac{1}{2}(NI)^2 \frac{\partial P}{\partial x} \quad S = \text{flux area} \tag{2}$$

$g$ = lateral clearance gap $$F_{axial} = \frac{1}{2}\frac{\mu}{g}(NI)^2 \frac{\partial S}{\partial x} \quad F_{axial} = \text{axial force due to radial gap} \tag{3}$$

$NI$ = magnetomotive force $x$ = travel of armature relative to stationary pole member To increase the output force of these solenoids or to decrease their current draw or power consumption, it usually is necessary to increase the diameter of the armature and thus the outer diameter of the solenoid. Generally, this is an unacceptable adjustment to the size of the solenoid. The dual stepped radial air gaps increase the air gap area and the $\partial S/\partial x$ term in the axial force equation. This allows the output force of the solenoid to be significantly increased without increasing the size of the solenoid. Alternatively, the outer diameter of the solenoid could be decreased or the current draw or power consumption reduced. In one demonstrative case, a flat force versus travel curve for a proportional control valve with dual lateral pole showed an increase of twenty-one percent (21%) of output force compared to a valve with a single pole.

Figure 8:
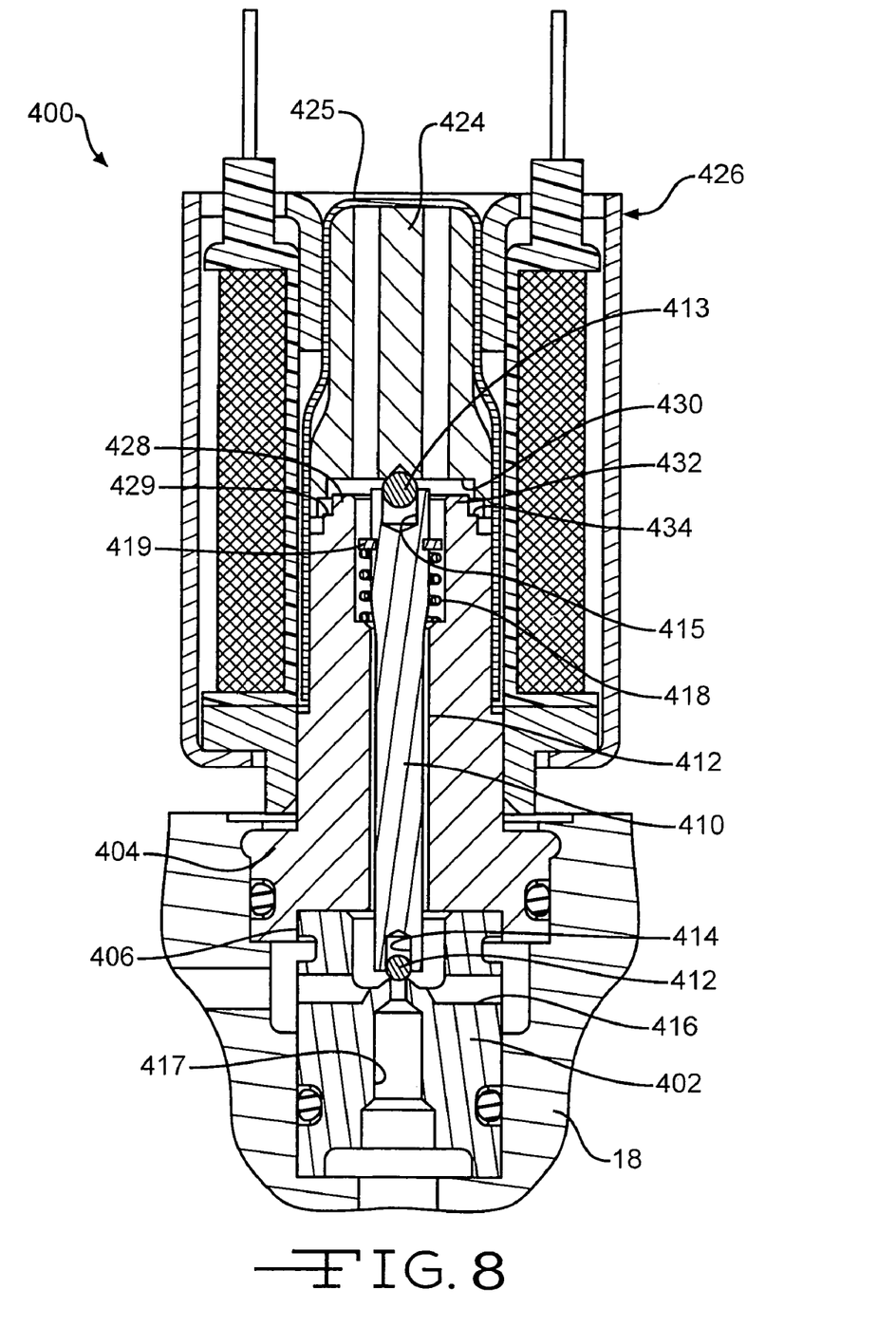
FIG. 8 is a sectional view of a normally open control valve according to the present invention illustrated in an energized closed position.

A third embodiment of a normally open control valve is indicated generally at 400 in FIG. 8. The control valve 400 can be used as the isolation valve 38 and/or the dump valve 44 in the brake system 10 of FIG. 1. The control valve 400 includes a seat or valve body 402 mounted in the housing 18. An adapter 404 has a lower annular recess 406 that receives the seat 402 to retain the adapter 404 thereto. An annular filter (not illustrated) can be fitted about or into the seat 402.

A pin 410 is slidably disposed in a bore 412 formed in the adapter 404. A first ball 412 is pressed into a cavity 414 formed in a first end of the pin 410. A second ball 413 is pressed into a cavity 415 formed in a second end of the pin 410. A cross hole 416 is formed in the seat 402 in fluid communication with an axial bore 417 of the seat 402. A first end of a spring 418 engages the adapter 404. A second end of the spring 418 engages a stop 419 mounted on the pin 410.

An armature 424 is received in a closed tube 425 that is attached to the adapter 404. A solenoid subassembly 426 is fitted over the tube 425. Upon energization, the solenoid subassembly 426 produces an electromagnetic force that urges the armature 410 against the spring 418 toward the adapter 404 to close the control valve 400.

The adapter 404 has a series of inwardly stepped portions. In the embodiment of FIG. 8, a first stepped portion 428 and a second stepped portion 429 are shown. A recess 430 is formed in the armature 424. The recess 430 is complementary to and receives the stepped portions 428 and 429 when the armature 424 moves from an open position to a closed position. Preferably, the recess 430 includes a first stepped portion 432 and a second stepped portion 434. This "double step" formed between the adapter 404 and the armature 424 increases the air gap area in the control valve 400 so that its output force is increased without increasing the size of the control valve 400. The increased axial force provided by this construction can permit the size of a control valve 400 to be reduced and still provide a desired output force.

Figure 9:
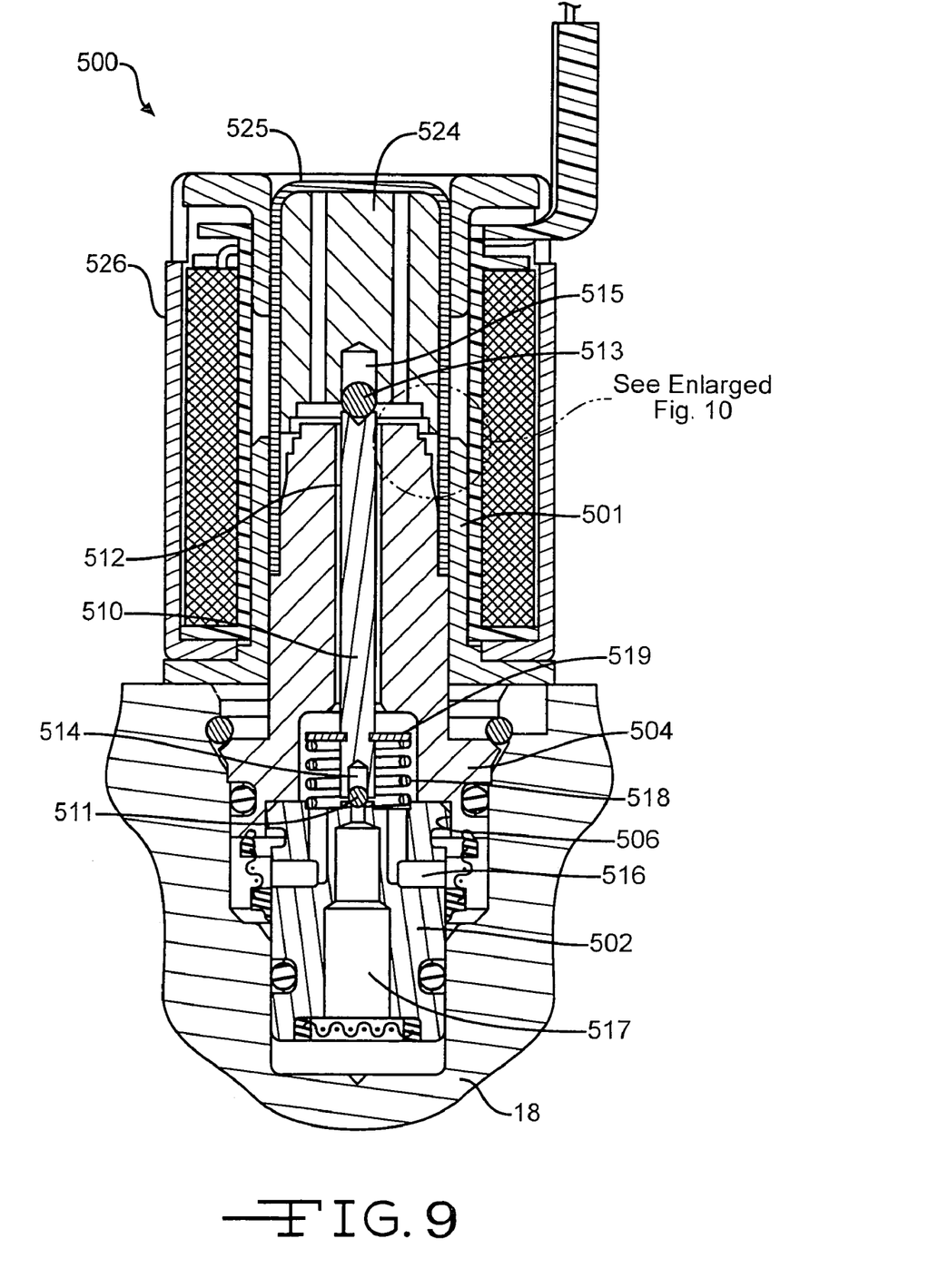
FIG. 9 is a sectional view of a normally open proportional valve according to the present invention illustrated in an non-energized open position.

A fourth embodiment of a normally open control valve is indicated generally at 500 in FIG. 9. The control valve 500 can also be used as the dump valve 44 in the brake system 10 of FIG. 1, as described below. The control valve 500 includes a seat or valve body 502 mounted in the housing 18.

A cross hole 516 is formed in the seat 502 in fluid communication with an axial bore 517 of the seat 502. An adapter 504 has a lower annular recess 506 that receives the seat 502 to retain the adapter 504 thereto. An inlet filter and an outlet annular filter are fitted about or into the seat 502. A bore 512 is formed through the adapter 504. A pin 510 is slidably disposed in the bore 512, and includes a first end 511 comprising a rounded surface, and a second end 513 comprising a rounded surface. In the embodiments illustrated in FIGS. 9 and 12, the rounded surface of the first end 511 comprises a first ball 511 which is pressed into a cavity 514 formed in a first end of the pin 510. In the embodiments illustrated in FIGS. 9 and 12, the rounded surface of the second end 513 comprises a second ball 513 which is pressed into a cavity 515 formed in the valve armature and connected to a second end of the pin 510. A first end of a spring 518 engages the seat 502. A second end of the spring 518 engages a stop 519 mounted on the pin 510.

An armature 524 is received in a closed tube 525 that is attached to the adapter 504. A solenoid subassembly 526 is fitted over the tube 525. Upon energization, the solenoid subassembly 526 produces an electromagnetic force that urges the armature 524 towards the adapter 504. Moving the armature 524 towards the adapter 504 also urges the pin 510 toward the valve seat 502, so that the ball 511 engages the seat to close the control valve 500. The movement of the pin 510 towards the valve seat 502 compresses the spring 518.

Figure 10:
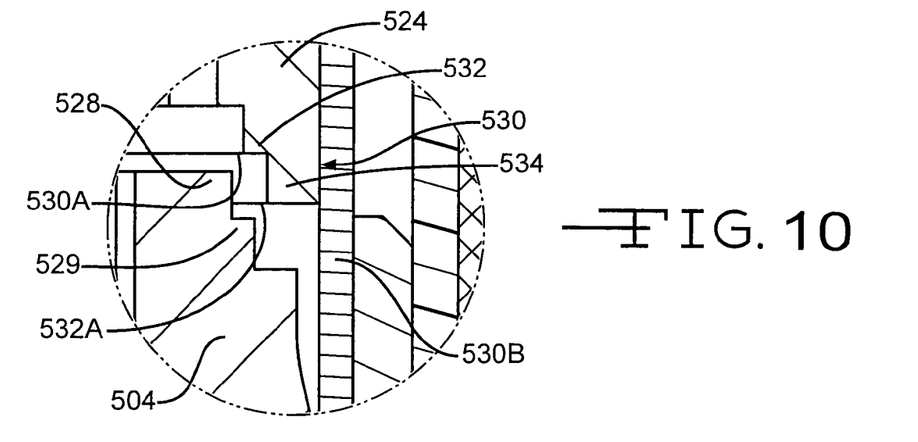
FIG. 10 is an enlarged portion of the proportional valve of FIG. 9 bounded by the circle labeled FIG. 10.
Figure 11:
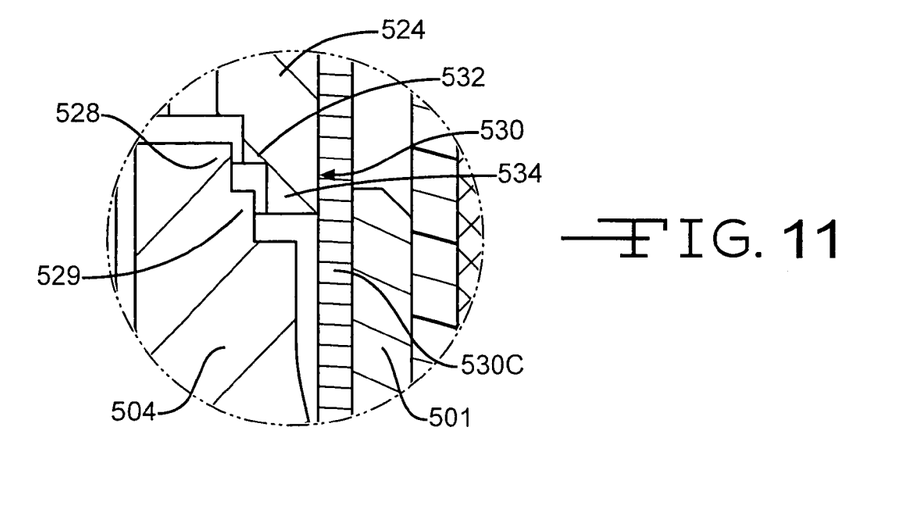
FIG. 11 is a view similar to FIG. 10, except with the valve illustrated in a energized closed position.

The adapter 504 has a series of inwardly stepped portions. In the embodiment of FIG. 9, and as more clearly seen in an enlarged portion shown in FIGS. 10 and 11, a first stepped portion 528 and a second stepped portion 529 are shown. A stepped recess 530 is formed in the armature 524. The recess 530 is substantially complementary to and generally receives the stepped portions 528 and 529 when the armature 524 moves from an open position to a closed position, as shown in FIG. 11, described below. However, due to manufacturing tolerances and other factors, it is not required that the armature 524 and adapter 504 match each other perfectly. Preferably, the recess 530 includes a first stepped portion 532 and a second stepped portion 534. This "double step" formed between the adapter 504 and the armature 524 increases the air gap area in the control valve 500 so that its output force is increased without increasing the size of the control valve 500. Specifically, a first air gap or flux gap 530a is defined between the step 532 of the armature 524 and the step 528 of the adapter 504, and a second flux gap 532a between the step 534 of the armature 524 and the step 529 of the adapter 504. The increased axial force provided by this construction can permit the size of the control valve 500 to be reduced and still provide a desired output force. This effect is preferably enhanced by a third flux gap 530b and is defined between the step 530 of the valve armature 524 and the flux ring or magnetic pole member or pole 501. The third gap herein is termed a lateral gap. This "triple gap" system as a whole works to increase the overall force that is operating on the valve armature 524 while maintaining a relatively linear force versus displacement operating curve for the control valve system.

Figure 10A:
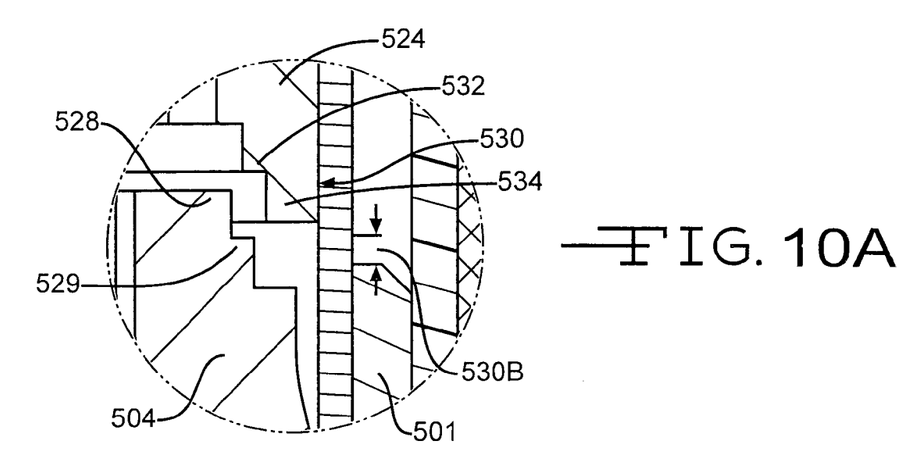
FIG. 10A is a view similar to FIG. 10, except with the armature and pole member positioned to more clearly depict an axial flux gap.

Additionally, the third gap 530b can have an axial component, as shown in FIG. 10A. As shown in FIG. 10A, flux ring 501 is positioned at a lateral and axial distance from the armature 524. The valve 500 in FIG. 10A is shown in an open position with the third flux gap 530b represented by the space between the end of the armature 524 and the top of the pole 501. This third flux gap 530b can be termed an axial gap. The double gap portion remains as defined between the steps 528, 529 of the adapter 504 and the steps 530, 532 of the armature 524. The armature 524 is preferably positioned axially distant from the pole 501 so that axial forces due to the axial flux gap are relatively small relative to the axial force due to the lateral gaps.

The armature 524 has been shown having a generally concave shape with the armature 524 recessed to fit over the pole piece. In an alternate embodiment the adapter can be recessed such that it can receive the armature. In either embodiment, the magnetic effect desired by the flux gap design is not changed by the use of a recessed armature or a recessed adapter.

Previously, a proportional solenoid valve with a high output stepped armature was proposed and disclosed and has been implemented. The dual stepped radial air gap increased the ail gap area and the $\partial S/\partial x$ term in the axial force equation. This allowed the output force of the solenoid to be significantly increased without increasing the size of the solenoid. In this proposed new design, the flux ring tube section was extended upwards to form an external third lateral gap. This third lateral gap adds another $\partial S/\partial x$ term to the axial force equation, thereby further increasing the axial output force without increasing the size of the solenoid. This concept has been described with respect to a normally open proportional solenoid valve however this design can similarly e adapted to a normally closed proportional solenoid valve. The use of this design concept creates a low cost or no cost method to further increase EHB output force or decrease current consumption and heating without changing solenoid size. Additionally, a flat force versus travel curve for a proportional control valve with triple lateral pole showed an increase of twelve percent (12%) of output force compared to a valve with a dual pole. Compounding this increase in force with the increase on force by using a double pole results in a total increase in force of output force of thirty-six percent (36%) over the output force of a single pole.

Shown in FIG. 11 is an enlarged portion of the embodiment of FIG. 9. In FIG. 11, the gap 530 between the adapter steps 528, 529 and the armature steps 532, 534 is reduced in that the normally open proportional valve is in an energized and closed position. In this position, the stepped portions 532, 534 of the armature 524 are moved closer to the generally complementary stepped portions 528 and 529 of the adapter 504, thereby reducing the gap 530.

In the embodiment shown in FIG. 9, the ball 511 is sized relative to the bore 512 so that the ball 511 is small enough to effectively self-center and thus seal in the bore in the valve seat 502. This helps ensure that the ball 511 is maintained in position over the valve opening despite hydraulic flow variation around the surface of the ball 511. While the lateral movement of the pin should be minimal using appropriate manufacturing tolerances, the design of this embodiment will allow prompt re-sealing of the ball 511 onto the bore in the valve seat 502. When the solenoid subassembly 526 is energized, the spring 518 will exert a sufficient force that the ball 511 to seal against the seat 502 against a maximum design pressure.

The shape of the seat 502, is preferably conical, and can minimize the flow forces on the portion that contacts the seat 502. The seating surface of the valve seat 502, is raised and is a generally planar surface. On either side of the upper planar surface of the valve seat 502, are angled side surface that extend into contact with a lower planar surface thereby forming the conically shaped valve seat 502. In this embodiment, the pin 510 and ball 511 assembly contacts and seals against the valve seat 502. In an alternate embodiment, such as that shown in FIG. 5, the valve armature 224 contacts that valve seat 210. One purpose for shaping the seat in such a manner is to minimize flow noise during routine valve operation. Where the material surrounding the seating surface is angled away from the armature or pin, the contact area is minimized thereby reducing the area over which flow forces can act. A seat shaped in this manner therefore tends to control of the valve by minimizing Bernoulli effects (flow forces) acting on the movable parts of the valve. The reduction in flow forces diminishes the deviation in the amount of magnetic force applied to the armature from a proscribed amount to maintain a proportional relationship between the force applied and the distance traveled by the armature 524. Additionally, the use of the pin 510 acts to separate the magnetic operations in the upper part of the valve 500 from the hydraulic operations in the lower part.

Figure 12:
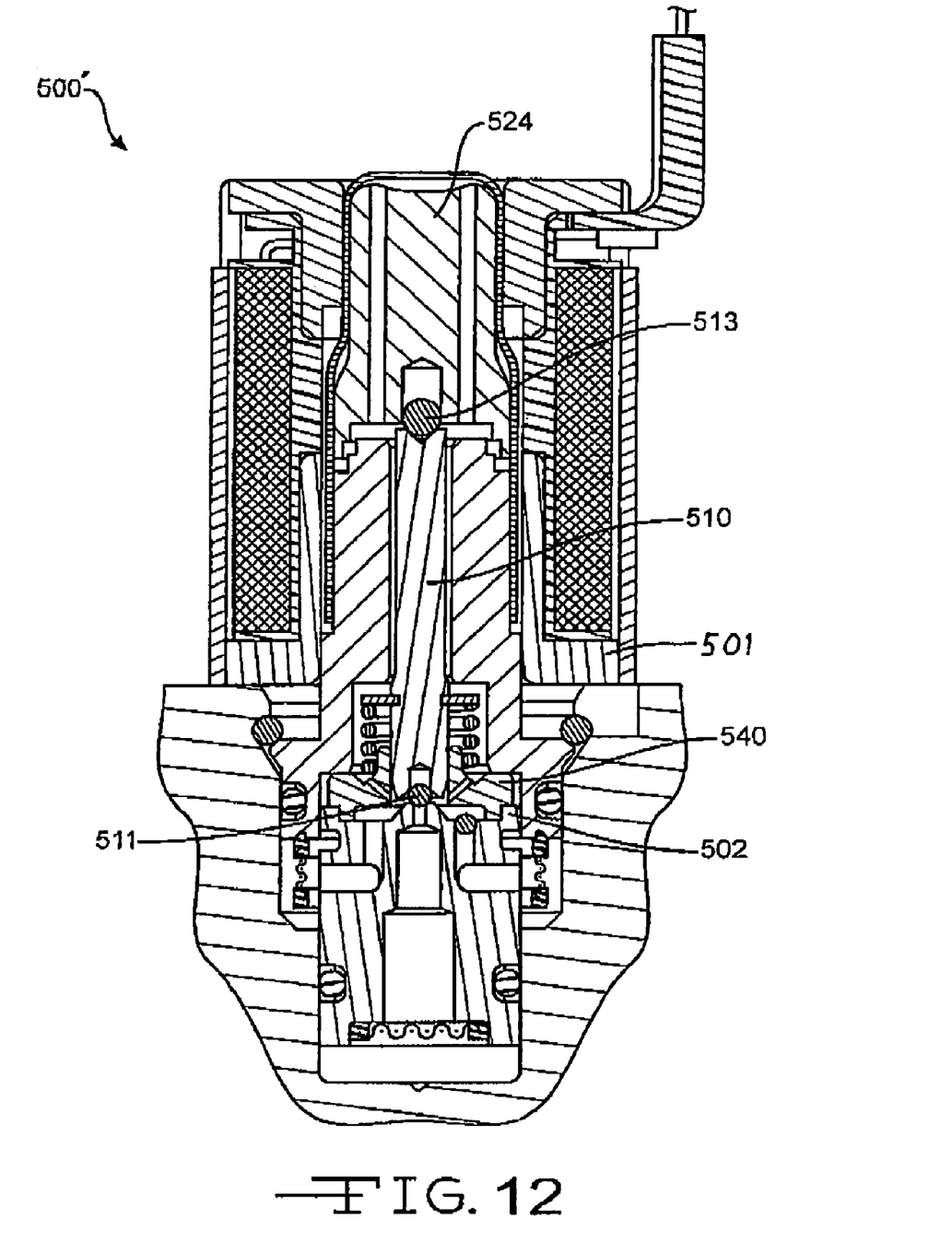
FIG. 12 is a sectional view of a normally open proportional valve according to the present invention illustrated in an non-energized position.

A fifth embodiment of a normally open control valve is indicated generally at 500' in FIG. 12. The control valve 500' is substantially similar to the valve shown in FIG. 9. Accordingly, the fifth embodiment also includes the magnetic pole member 501, illustrated in FIG. 12. In a preferred embodiment, however, the valve 500' has a pin guide system 540. The pin guide system 540 will allow the valve to maintain alignment of the pin 510 with the bore on the valve seat 502. The pin 510 is radially supported by the pin guide 540 at the lower end of the pin 510. This ensures that the ball 511 is maintained in position over the valve opening in the valve seat 502 despite hydraulic flow variation around the surface of the ball 511. Due to the constraints of the pin guide 540, the pin 510 can pivot only at the second ball 513 at the armature 524. In this embodiment it is also preferred that the pin guide 540 engages the seat 502 as a separate piece. Additionally, the adapter materials are selected for a good magnetic performance whereas the seat materials are generally selected based on durability and other performance traits.

In any of the embodiments described above, and particularly those shown in FIGS. 9 through 12, it is preferred that the upper part of the armature 524 is centered and well-guided within the magnetic coil to minimize side loading and to maintain repeatable performance. This may be accomplished with a close tolerance gap between the armature 524 and sleeve 525. The use of a low-friction material on the armature and other elements further allows for ease of movement of those elements. Particularly, a low-friction coating such as "NIFLOR" can be used. The use of such a coating can also be used on the armature 524, pin 510 and other moving parts of the valve 500 and 500'.

Additionally, in the embodiments described and shown above in FIGS. 9 through 12, the valve 500, 500' has been shown as a normally-open valve. However, with minor adjustments, the valve can be used as a normally-closed valve. In particular, the spring 518 could be removed and another spring could be disposed between the stop 519 and the adapter 504. The spring could then bias the pin 510 and ball 511 towards the valve seat 502. Using the valve in a normally-open or normally-closed position does not depart from the scope of the invention in that the advantages of the valves 500 and 500', such as the "double-step" or "triple-gap" design, still apply.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for a vehicular brake system comprising:
    a valve seat;
    an adapter having a bore formed therethrough, said adapter fixed relative to said seat;
    a pin slidably positioned within said bore and further comprising a first and second end, said second end of said pin comprising a rounded surface;
    a biasing spring engaging said pin and said valve seat for forcing said pin in a direction that is one of away from said valve seat and towards said valve seat;
    an armature that is slidably supported relative to said adapter and a magnetic pole member for movement between a fully open position and a closed position, said armature engaging said second end of said pin whereby movement of said armature causes movement of said pin, said armature and adapter further comprising complementary stepped portions wherein said adapter stepped portions are adapted to receive said armature stepped portions, said stepped portions defining a first lateral flux gap and a second lateral flux gap; and
    a flux ring mounted on said adapter and being disposed about a portion of said armature, a third lateral flux gap being defined between a portion of said flux ring disposed about said armature and the portion of said armature disposed in said flux ring; and
    an electrical coil for selectively inducing a magnetic field for moving said armature.

2. The control valve according to claim 1, wherein said first end of said pin pivotally engages said valve seat.

3. A control valve for a vehicular brake system comprising:
    a valve seat;
    an adapter having a bore formed therethrough, said adapter being fixed relative to said seat;
    an armature;
    a biasing spring engaging said armature and a magnetic pole member for forcing said armature in a direction that is one away from said valve seat and towards said valve seat;
    said armature being slidably supported relative to the magnetic pole member for movement between a fully open position and a closed position, said armature engaging said valve seat whereby movement of said armature causes said armature to respectively unseat or seat the valve;
    said armature and said magnetic pole member further comprising complementary stepped portions wherein said pole member stepped portions are adapted to receive said armature stepped portions, said stepped portions defining a first lateral flux gap and a second lateral flux gap; and
    a flux ring mounted on said magnetic pole member and disposed about a portion of said armature, a third lateral flux gap being defined between a portion of said flux ring disposed about said armature and the portion of said armature disposed within said flux ring; and
    an electrical coil for selectively inducing a magnetic field for moving said armature.

* * * * *

UNITED STATES PATENT AND TRADEMARK OFFICE
CERTIFICATE OF CORRECTION

| | |
|---|---|
| PATENT NO. | : 7,396,090 B2 |
| APPLICATION NO. | : 11/349536 |
| DATED | : July 8, 2008 |
| INVENTOR(S) | : Gregory J. Krawczyk et al. |

Page 1 of 1

It is certified that error appears in the above-identified patent and that said Letters Patent is hereby corrected as shown below:

Column 14, Claim 3, Line 40, after "is one" insert --of--.

Signed and Sealed this

Twenty-third Day of September, 2008

JON W. DUDAS
*Director of the United States Patent and Trademark Office*